Figure 1:
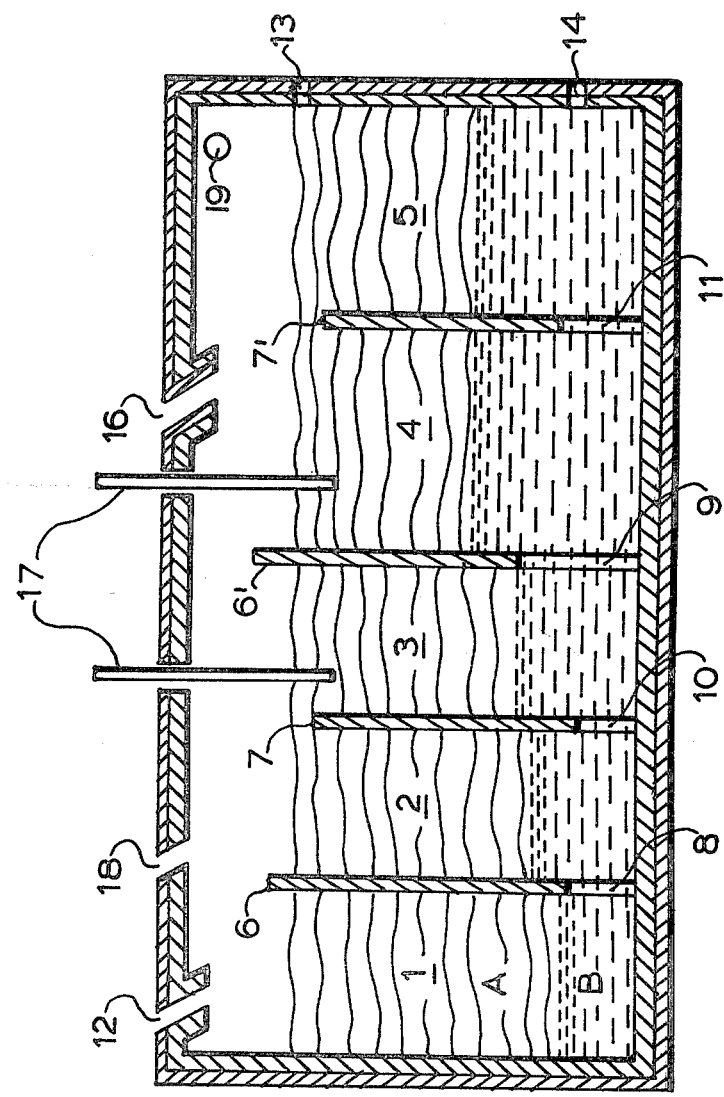

United States Patent [19]

Dimitrov et al.

[11] Patent Number: 4,484,730
[45] Date of Patent: Nov. 27, 1984

[54] DEVICE FOR LEACHING COPPER FROM SLAGS

[75] Inventors: Issay M. Dimitrov; Atanas P. Boychev; Vesselin L. Ralchev; Georgi Y. Kostov, all of Sofia, Bulgaria

[73] Assignee: ISO "Metalurgkomplekt", Sofia, Bulgaria

[21] Appl. No.: 431,114

[22] Filed: Sep. 30, 1982

[51] Int. Cl.³ .............................................. F27B 3/16
[52] U.S. Cl. .................................... 266/201; 266/229; 75/24; 75/72
[58] Field of Search ............... 266/201, 227, 215, 161, 266/171, 195, 196, 228–232; 75/24, 72–76, 63

[56] References Cited

U.S. PATENT DOCUMENTS

| | | | |
|---|---|---|---|
| 2,741,556 | 4/1956 | Schwartz | 266/196 |
| 3,687,656 | 8/1972 | Maelzer et al. | 75/76 |
| 4,294,433 | 10/1981 | Vanjukov et al. | 266/215 |

FOREIGN PATENT DOCUMENTS 643325 6/1962 Canada ................................ 266/215

Primary Examiner—M. J. Andrews

[57] ABSTRACT

Method of and apparatus for leaching copper from slags by the use of a device comprising at least two cells separated by partitions and connected to each other by means of through-holes provided at the bottom part of the partitions, a slag charging hole, a copper matte charging hole, a slag discharge hole, a copper matte discharge hole, and a heating appliance, said partitions being alternately higher and lower, the height of the through-holes through the higher partitions increasing toward the slag discharge holes. Said method includes reduction, sulphidization, and copper matte rinsing of the slag, the copper matte rinsing of the slag being accomplished by its successive movement from one cell into another through a copper matte layer in alternately downward and upwardly directed streams. The passage of the slag through the higher partitions is accomplished through a copper matte sealing formed at the through-holes, and the passage of the slag past the lower partitions is accomplished over the upper edges of said lower partitions.

8 Claims, 2 Drawing Figures

DEVICE FOR LEACHING COPPER FROM SLAGS

This invention relates to a device and method for the leaching of copper from slags.

A device is known for copper leaching from converter slags, which includes at least two cells, separated by partitions, where through-holes are provided at the bottom part of said partitions. At least two of the above said cells are equipped with mechanical water cooled stirrers. This device also includes a slag charging hole, a copper matte charging hole, a slag discharge hole, and a copper mate discharge hole, as well as a heating appliance.

The method for leaching cooper from slags using the above said device is operated as follows: the bottom part of the device is filled up with copper matte. Then, molten slag is poured thereinto. Carbonaceous material is added to the slag as the reducing agent and the process of mixing is accomplished by water cooled stirrers. Then, pyrite is added as the sulphidization agent. After the completion of the reduction process, copper matte rinsing of slag is carried out, which results in the transition of the copper contained in the slag into the copper matte. A counterflow is ensured in a horizontal direction between the slag and the copper matte.

The disadvantages of the devices and method known heretofore consist in the following: the process of mixing the slag with the reducing agent and the process of copper matte rinsing of the slag was carried out using water cooled stirrers; this caused an excessive abrasive wear of the walls and partitions of the device. There is thus created the possibility for leakage in the water cooled jacket of the stirrers, which results in both considerable working expenses incurred during repair of the device, and idle time thereof.

The object of this invention is to provide a device and method for leaching copper from non-ferrous metallurgical slags ensuring and intensive copper matte rinsing of the slag without any mechanical water-cooled stirrers.

The device for leaching copper from non-ferrous metallurgical slags includes at least two cells, separated by partitions and connected to each other by means of through-holes provided at the bottom parts of said partitions; a slag charging port; a copper matte charging port; a slag discharge opening and a copper matte discharge opening as a passage for well as a heating appliance. According to the invention, successive ones of said partitions are alternatively of greater and smaller height, the height of the through-holes of the higher partitions increasing towards the slag discharge hole, the height of the through-holes of the lower partitions being one and the same. When the first partition is of the higher type, the slag charging port is located in the upper part of the first cell, and when it is of the lower type, the slag charging port is located in the bottom part of the first cell.

The method of leaching copper from slags using the above said device consists in reduction, sulphidization and copper matte rinsing of the slag. The process of copper matte rinsing of the slag according to the invention is accomplished by passing the slag as alternately upper and lower streams successively from one cell into another through a layer of copper matte. The slag moves over the partitions of smaller height while the partitions of greater height are passed through a copper matte sealing, formed at the through-holes.

The advantages of the device and method according to the invention are as follows: both working and maintenance expenses are lower, due to the simplified structure of the device; the method ensures a very close contact between the slag and copper matte phases, which leads to a high rate of leaching copper from the slag; the structure of the device permits the processes of the melting of the raw materials and the leaching of the copper from the slag to be aggregated together in a continuous process, which leads to low working expenses.

Figure 2:
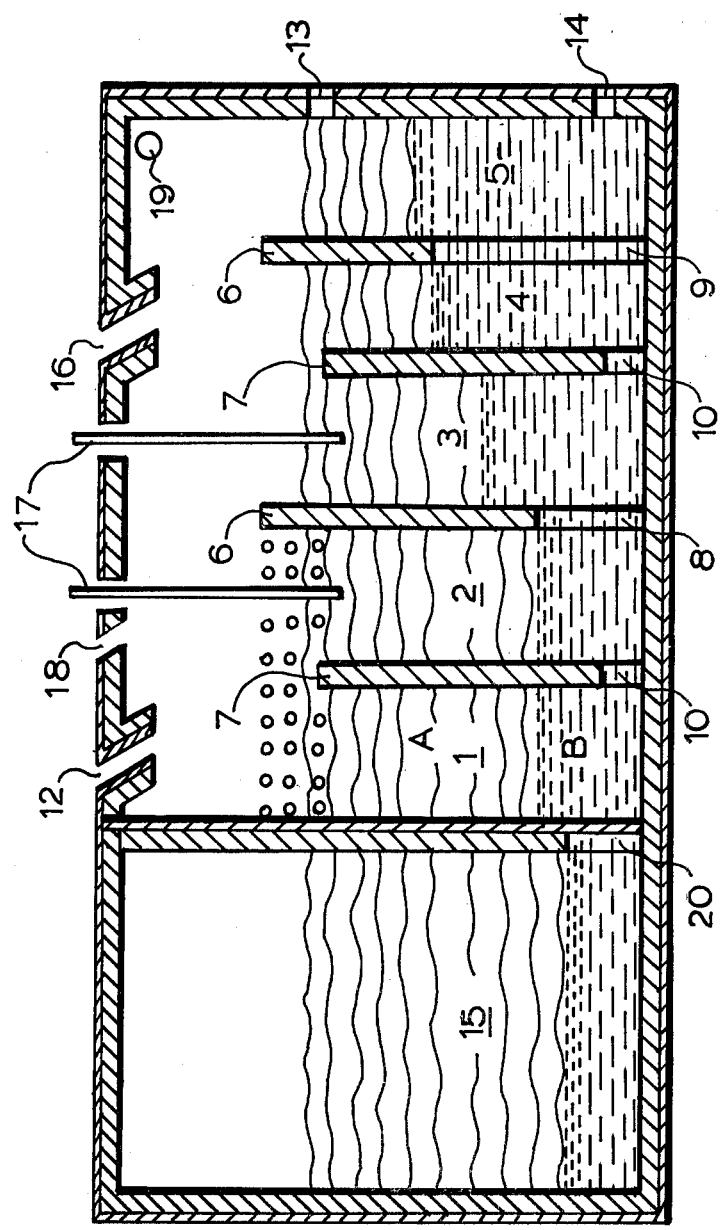

The invention will be more fully understood upon consideration of the accompanying drawings, wherein:

FIG. 1 is a view in vertical longitudinal section through a first embodiment of the apparatus of the invention, and FIG. 2 is a similar view of a second embodiment of the apparatus of the invention.

The first embodiment of the device for leaching copper from converter slags, shown in FIG. 1, includes cells 1 2, 3, 4 and 5, which are separated from each other by alternating taller partitions (of greater height) and lower partitions (of smaller height) which are designated 6, 7, 6' 7', reading in the direction from left to right. The first partition 6, which separates cell 1 from zone 2, is of the taller type. Successive cells are connected to each other by means of through-holes which extend from the inner surface of the bottom of the device upwardly to varying distances. Thus the through-holes 8 in partition 6 are taller than the through-holes 10 in partition 7. The same is true of the through-holes 9 in partition 6' relative to the height of the through-holes 11 in partition 7'. In other words, the height of through-holes 8 and 9 of the taller partitions 6 and 6' increases in the direction toward the right, that is toward the slag discharge hole 13, and the height of the through-holes 10 in partition 7 is less than the height of the through-holes 11 in partition 7'. It is to be noted that partitions 7 and 7' are of the same height, whereas partition 6' is somewhat taller than partition 6.

In addition to a slag discharge opening 13 in the right-hand end wall of the device, there are provided an inlet port 18 in the roof of the device for the addition of a sulphidization agent, and an outlet port 19 for gases provided in the upper part of a side wall of the device. An outlet opening 14 for the discharge of copper matte is provided in the lower part of the last cell 5 of the device, said outlet opening 14 being located below the slag discharge opening 13. The upper wall or roof of the device is provided with a charging port 12 for receiving converter slag and a sulphidization agent, the port 18 for receiving a reducing agent, passages for receiving heating electrodes 17 for supplementary heating, and a port 16 for receiving a gas or liquid fuel consuming burner.

The above-described device shown in FIG. 1 operates as follows: copper matte in amounts sufficient to form copper matte sealings at the through-holes 8 and 9 is poured into the device through the port 12. Then, converter slag is supplied through the port 12, and reducing agent and sulphidization agent are added thereinto through the holes 12 and 18 respectively. Due to the slag pressure head in cell 1, the slag A gravitates as a downstream through the copper matte layer B and then passes through the copper matte sealing, formed at the through-hole 8 of the first, taller partition 6. Thus a close contact is ensured between the slag, the reducing agent, the sulphidization agent, and the copper matte.

The copper matte and metal particles dispersed within the slag are extracted from the copper matte phase as a result of the copper matte rinsing of the slag.

Passing the copper matte sealings formed at through-holes 8 and 9, the slag moves through the copper matte layer as an upward stream and enters the cell 3, passing over the partition 7. The successive motion of the slag from zone 3 into cells 4 and 5 is repeated in the same manner as its motion from zone 1 into cells 2 and 3; the decoppered slag and the copper matte is discharged at regular intervals or continuously from holes 13 and 14, respectively. During its downstream motion, the slag passes through the copper matte sealings formed at the through-holes of the higher partitions, and during its upstream motion, the slag enters the next cell by passing over the lower partitions. The alternation of the direction of slag movement during its passage from one cell to another promotes an accelerated sedimentation of the copper matte and the metal particles of the slag phase.

A second embodiment of the device for leaching copper from non-ferrous metallurgical slags is shown in FIG. 2. The device includes cells 1, 2, 3, 4 and 5, separated therebetween by alternating lower (7) and higher (6) partitions. The partition 7 which separates cells 1 and 2 is of the lower type. Individual cells are connected to each other by means of through-holes, located in the bottom part of the partitions with the height of the higher partitions increasing towards the slag discharge opening 13 of the last zone 5 and the height of the through-holes of the lower partitions being one and the same. The cell 1 of the device is connected to a furnace 15 for melting of raw materials by means of a through-hole 20, which is located in the bottom part of cell 1. Inlet port 12 and 18 for sulphidization agent and reducing agent, respectively, and outlet port 19 for gases are provided at the upper part of the device. A copper matte discharge opening 14 is provided in the bottom part of the last zone 5, said hole being located below the slag discharge opening 13. The device also includes electrodes 17 for supplementary heating of the melt and burner 16 for liquid or gas fuel heating.

The method for copper leaching from slags using the above outlined device is carried out as follows: the slag-copper matte melt obtained in the melting furnace 15 passes the through-hole 20 and enters the cell 1, where mixing with the converter slag and reducing agent added through the port 12 takes place. Sulphidization agent is added through the inlet ports 12 and 18. From cell 1, the slag enters the zone 3, passing as a downstream through the copper matte sealing formed at the through-hole 8 of the higher partition 6. Then, the slag moves as alternating upward and downward streams from one cell into another, passing through a layer of copper matte. Slag is discharged through opening 13, and copper matte is discharged through opening 14. The processes which take place are similar to those in the first embodiment.

In a further, unillustrated method, decoppering of converter slags is performed in a device provided with two partitions, i.e. a lower and a higher partition. The device is filled up with slag-copper matte melt of a temperature of 1180–1200 degrees C. until copper matte sealing is formed. Fused coke is introduced into the first cell of the device, which serves as the reducing medium. Sulphidization agent is also added. The slag is heated to a temperature of 1200–1220 degrees C. is poured from the converter directly onto the coke filter. The slag passes as a downstream through the copper matte layer in the first cell, then moves through the copper matte sealing formed at the through hole of the first higher partition and passes as an upward stream over the lower partition, entering the third zone. The copper content of the initial slag is 0.68%, and that after the process of decoppering is 0.29%.

In a still further, unillustrated method, decoppering of waste slags is carried out in the device as described in the preceding paragraph. The device is filled up with slag-copper matte melt of a temperature of 1180–1200 degrees C. until copper matte sealing is formed. Then, liquid slag, reducing agent and sulphidization agent are added while the temperature of the melt is kept at 1200 degrees C. The movement of the slag through the individual zones of the furnace is the same as that described in the preceding paragraph. The copper content of the initial waste slag is 0.37% and that after the process of decoppering is 0.17%.

Although the invention is illustrated and described with reference to a plurality of embodiments thereof, it is to be expressly understood that it is in no way limited to the disclosure of such preferred embodiments but is capable of numerous modifications within the scope of the appended claims.

We claim:

1. A device for leaching copper from slags, which includes: at least first, second and third cells arranged in succession in a common chamber the successive cells each having a side wall, the cells being separated by partitions and serially connected to each other by means of through-holes provided in the bottom part of the partitions the device having a slag and/or matte charging port a reagent feeding port a heating appliance receiving port, and a gas discharge port, all of said ports being disposed in the upper part of the common chamber above the cells therein, a slag discharge opening and a copper matte discharge opening in the outer end wall of the last of the successive cells, said partitions being alternatingly of greater and smaller height, the heights of the through-holes in the partitions of greater height increasing towards the slag discharge opening and the height of the through-holes in the partitions of smaller height not exceeding the height of the through hole in the first partition between the first and second of the successive cells.

2. A device according to claim 1 characterized in that said first partition is of the higher type and said slag charging port is located in the upper part of one of the outer walls of the first cell.

3. A device according to claim 1, characterized in that said first partition is of the lower type, and said slag charging port is located in the bottom part of one of the outer walls of the first cell.

4. The device according to claim 1 characterized in that the lower partitions are adapted continuously to be immersed with their upper part in the slag, and their lower part is adapted to be immersed in the copper matte.

5. A device according to claim 1, characterized in that the slag discharge opening is on any of the outer walls of the last cell and is situated between the upper ends of the higher and the lower portions.

6. A device according to claim 1, characterized in that the copper matte discharge hole is in the lower part of the side wall of any of the cells and is situated no higher than the through hole of the lower partition walls.

7. A device according to claim 1, characterized in that all of the cells have one common gas chamber above them, said gas discharge port being connected to said one common gas chamber.

8. A method of leaching copper from slags by the use of a device comprising at least two zones separated by partitions and connected to each other by means of through-holes provided at the bottom part of the partitions, a slag charging hole, a copper matte charging hole, a slag discharge hole, a copper matte discharge hole, and a heating appliance, said partitions being alternately higher and lower, the height of the through-holes through the higher partitions increasing toward the slag discharge hole, said method comprising reduction, sulphidization, and copper matte rinsing of the slag, wherein the copper matte rinsing of the slag is accomplished by means of its successive movement from one zone into another through a copper matte layer in alternately downward and upwardly directed streams, and wherein the passage of the slag through the higher partitions is accomplished through a copper matte sealing formed at the through-holes, and the passage of the slag past the lower partitions is accomplished over the upper edges of said lower partitions.

* * * * *